US 12,196,575 B2

(12) United States Patent
Royer et al.

(10) Patent No.: US 12,196,575 B2
(45) Date of Patent: Jan. 14, 2025

(54) METHODS AND SYSTEMS FOR AUTOMATIC CALIBRATION OF GYROSCOPE BIAS IN THE PRESENCE OF MOTION

(71) Applicant: CloudNav Inc., San Jose, CA (US)

(72) Inventors: Nathan Charles Royer, San Jose, CA (US); Erik E. Anderson, Menlo Park, CA (US)

(73) Assignee: CloudNav Inc., San Jose, CA (US)

( * ) Notice: Subject to any disclaimer, the term of this patent is extended or adjusted under 35 U.S.C. 154(b) by 422 days.

(21) Appl. No.: 17/649,346

(22) Filed: Jan. 28, 2022

(65) Prior Publication Data

US 2022/0244074 A1 Aug. 4, 2022

Related U.S. Application Data

(60) Provisional application No. 63/143,647, filed on Jan. 29, 2021.

(51) Int. Cl.
*G01C 25/00* (2006.01)
*G01C 19/00* (2013.01)
*G01P 13/00* (2006.01)
*G01P 15/00* (2006.01)
*G06F 3/01* (2006.01)

(52) U.S. Cl.
CPC ............. *G01C 25/00* (2013.01); *G01C 19/00* (2013.01); *G01P 13/00* (2013.01); *G01P 15/00* (2013.01); *G06F 3/012* (2013.01); *G06F 3/013* (2013.01)

(58) Field of Classification Search
CPC ...... G01C 25/00; G01C 19/00; G01C 25/005; G01P 13/00; G01P 15/00; G06F 3/012; G06F 3/013
See application file for complete search history.

(56) References Cited

U.S. PATENT DOCUMENTS

| | | | | |
|---|---|---|---|---|
| 2001/0029409 A1* | 10/2001 | Tiede | ...................... | G01S 19/49 |
| | | | | 701/1 |
| 2010/0288030 A1* | 11/2010 | Shin | ........................ | G01M 1/28 |
| | | | | 73/66 |
| 2012/0323520 A1* | 12/2012 | Keal | .................. | G01C 19/5776 |
| | | | | 702/141 |
| 2013/0239682 A1* | 9/2013 | Painter | .................. | C23C 28/042 |
| | | | | 427/126.3 |
| 2018/0267074 A1* | 9/2018 | Keal | ........................ | G01P 13/00 |
| 2019/0390976 A1* | 12/2019 | Anderson | ............... | G06F 3/013 |

* cited by examiner

*Primary Examiner* — Peter J Macchiarolo
*Assistant Examiner* — John M Royston
(74) *Attorney, Agent, or Firm* — Perkins Coie LLP

(57) ABSTRACT

Devices and methods for automatic calibration of rate gyroscope bias are described. One example method includes receiving, while the device is in motion, a plurality of measurements from one or more sensors, including a gyroscope, in the device. In this example, the plurality of measurements is acquired over a time period. The method also includes identifying one or more time segments, within the time period, having a low motion activity of the device by comparing a computed value associated with a motion of the device to a predetermined threshold. The method further includes determining, based on one or more measurements acquired over the one or more time segments, a degree of motion metric for at least one of the one or more sensors, and determining, based on the degree of motion metric for the at least one of one or more sensors, an estimate of a bias of the gyroscope.

20 Claims, 12 Drawing Sheets

METHODS AND SYSTEMS FOR AUTOMATIC CALIBRATION OF GYROSCOPE BIAS IN THE PRESENCE OF MOTION

CROSS-REFERENCE TO RELATED APPLICATION

This patent document claims priority to and benefits of U.S. Provisional Patent Application No. 63/143,647, entitled "AUTOMATIC CALIBRATION OF GYROSCOPE BIAS WITHOUT A TRUTH REFERENCE IN THE PRESENCE OF MOTION," and filed on Jan. 29, 2021. The entire content of the before-mentioned patent application is incorporated by reference as part of the disclosure of this patent document.

TECHNICAL FIELD

This document generally relates to gyroscopes, and more particularly to improving calibration of gyroscopes.

BACKGROUND

A gyroscope is a device used for measuring or maintaining orientation and angular velocity. In an example, a gyroscope includes a spinning wheel or disc in which the axis of rotation is free to assume any orientation by itself. The orientation of this axis is unaffected by tilting or rotation of the mounting when the gyroscope is operating. A rate gyroscope is a type of gyroscope that indicates a rate of change of an angle as a function of time (as compared to a traditional gyroscope that indicates direction).

The bias of a rate gyro is the average output from the gyroscope when it is not undergoing any rotation, e.g., the offset of the output from the true value. In an example, the bias is measured in degrees/hour. The constant bias error of a rate gyro is typically estimated by taking a long-term average of the gyro's output whilst it is not undergoing any rotation.

SUMMARY

Embodiments of the disclosed technology relate to methods, systems and devices that, among other features and benefits, can be used for calibrating rate gyroscope bias without a truth reference in the presence of motion. In an example, the disclosed embodiments advantageously eliminate the need for accurate calibration in the factory, and enable automatic bias calibration in the presence of motion through observation of unguided user motions. In another example, the disclosed embodiments also automatically track rate gyroscope bias changes through aging, stress changes, and changes in temperature that may affect the various components of the gyroscope.

One aspect of the disclosed embodiments relates to a method for receiving, while the device is in motion, a plurality of measurements from one or more sensors in the device, wherein the one or more sensors comprise a gyroscope. The plurality of measurements is acquired over a time period. The method also includes identifying one or more time segments, within the time period, having a low motion activity of the device by comparing a computed value associated with a motion of the device to a predetermined threshold. The method further includes determining, based on one or more measurements acquired over the one or more time segments, a degree of motion metric for at least one of the one or more sensors, and determining, based on the degree of motion metric for the at least one of one or more sensors, an estimate of a bias of the gyroscope.

In another example aspect, a device comprising one or more sensors that include a gyroscope is described. The device includes a processor coupled to the one or more sensors, and a memory including instructions stored thereupon. The instructions upon execution by the processor cause the processor to receive, while the device is in motion, a plurality of measurements from one or more sensors in the device, wherein the plurality of measurements is acquired over a time period. The instructions upon execution by the processor also cause the processor to identify one or more time segments, within the time period, having a low motion activity of the device by comparing a computed value associated with a motion of the device to a predetermined threshold. The instructions upon execution by the processor further cause the processor to determine, based on one or more measurements acquired over the one or more time segments, a degree of motion metric for at least one of the one or more sensors, and determine, based on the degree of motion metric for the at least one of the one or more sensors, an estimate of a bias of the gyroscope.

DETAILED DESCRIPTION

Existing implementations for gyro bias calibration use raw sensor data from one or more sensors, e.g., accelerometers and gyroscopes, to determine the motion of the device, and integrates the raw sensor data to produce a model of the orientation of the device using world coordinates. However, these existing implementations reflect the long-standing practice of performing gyroscope bias calibration by making an explicit gyroscope bias measurement during periods where the gyroscope is motionless. In contrast, embodiments of the disclosed technology, among other features and benefits, provide solutions for gyro bias calibration while the device is in motion.

In the sections that follow, for brevity, a rate gyroscope is sometimes referred to as a "gyroscope" or "gyro." Section headings are used in the present document to improve readability of the description and do not in any way limit the discussion or the embodiments (and/or implementations) to the respective sections only.

Overview and Initial Discussion of Rate Gyroscope Bias Calibration

Rate gyroscopes have errors that are due to many factors. When used in consumer devices and applications, calibrating for these errors is needed to produce a good user experience. The error offset (referred to as bias) when uncalibrated can make it seem like the device is rotating when it is still. The sensitivity error will cause it to look like the device has rotated more or less than it actually has. The disclosed embodiments focus, in part, on calibration of the error offset or bias.

Figure 1:
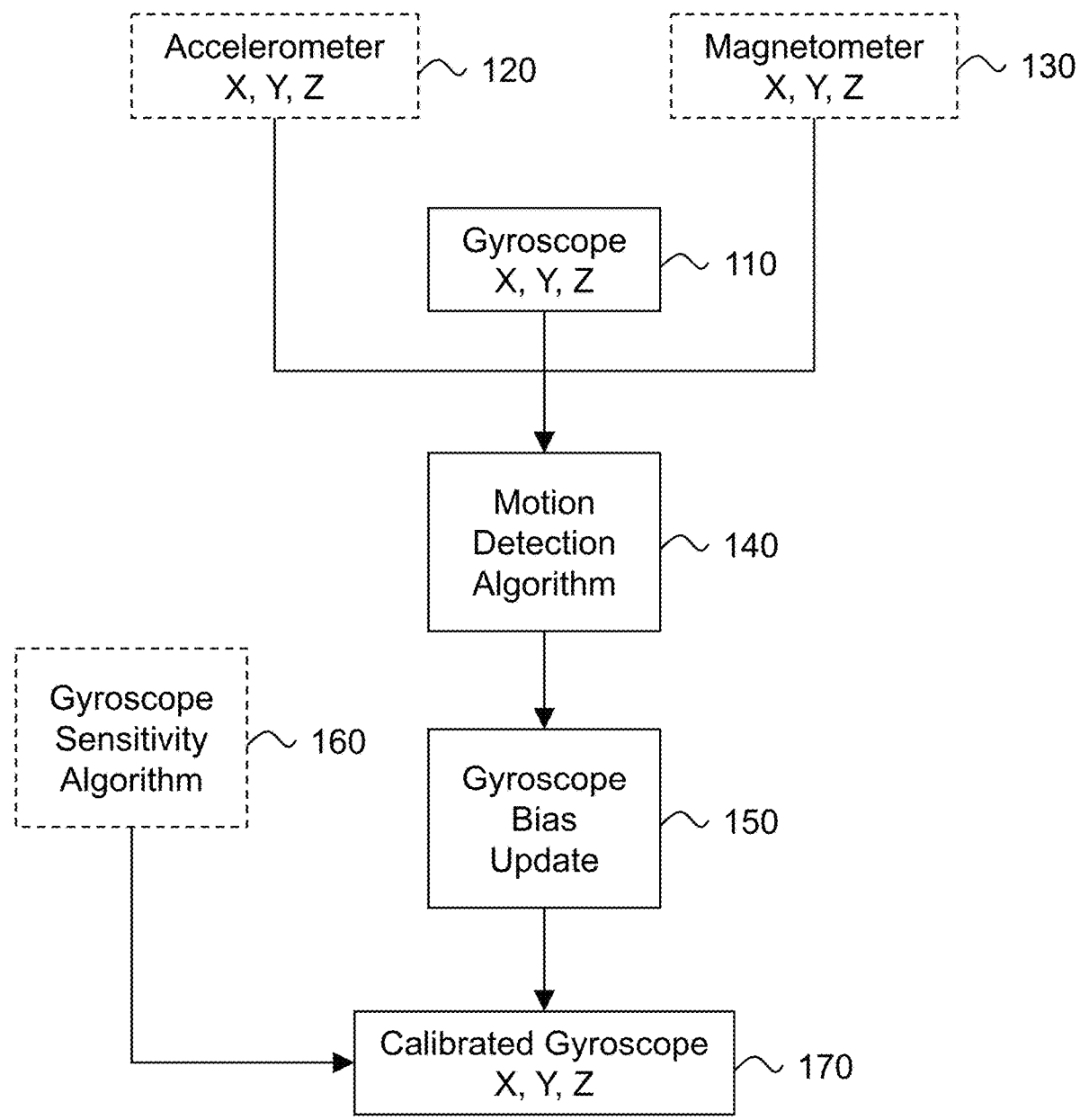
FIG. 1 illustrates an example block diagram for gyroscope calibration.

The aforementioned calibration procedures are outlined in FIG. 1, which illustrates an example block diagram for gyroscope calibration. As illustrated therein, a motion detection algorithm processes x-, y- and z-axis measurements from the gyroscope (110), and optionally, a set of measurements from the accelerometer (120) and magnetometer (130). The output of the motion detection algorithm (140) is used to compute a gyro bias update (150), which is then used to calibrate the gyro (170). Optionally, the gyro sensitivity (160) can be determined and also incorporated into the gyro calibration process. In an example, additional details for determining the gyroscope sensitivity may be found in U.S. Pat. No. 11,204,257, which is incorporated by reference in its entirety.

To determine the bias of a gyro, the gyro must be made to not rotate, at which time any non-zero measurement is the bias error. Bias is traditionally measured at the factory, by forcing the device to be still (no rotational motion) for a short period of time and then storing the bias values in persistent memory to be applied to gyro measurements in the future. Alternatively, bias can be opportunistically detected when the device is placed on a still surface and it is determined to be still using a no-motion detection algorithm.

However, this can be problematic for devices and applications that will not have the gyro running during periods of no-motion. For example, a device that is intended to be attached to a person or animal for the entirety of its lifetime, or a device where power saving techniques turn off the gyro before no-motion can be detected, will result in no periods of no-motion.

Embodiments of the disclosed technology provide solutions for determining the bias in the presence of motion, which can be used, for example, in the aforementioned situations. In some embodiments, the bias of a gyro can be determined in the presence of motion by relying on short periods of low motion. This advantageously eliminates the requirement that a device experience no-motion periods (which are typically required for gyro bias estimation) and provides a calibration solution that is significantly faster than traditional methods.

In some embodiments, the calibration method used to determine the bias of a gyro in the presence of motion processes short time periods of data, determines the degree of motion during each of the short time periods, and then decides how to update the current gyro bias estimate. When this is performed over time, e.g., for typical human motion, the number of short periods of low motion are numerous enough to determine a bound for the bias estimate, and then converge on a solution that is accurate enough to provide a good user experience for a variety of applications discussed in this patent document.

Degree of Motion Discussion

There are many ways to determine the degree of motion a device is undergoing. In an example, since the device has built-in motion sensors, in the absence of errors, simply reading them will give a very good idea of the degree of motion; for example, a non-zero gyro reading would indicate rotation, the accelerometer reading would be less than or greater than the force of gravity, and/or the magnetometer reading would change as it rotated about the magnetic field.

Errors in the motion sensors manifest as bias errors and sensitivity errors. In an example, before the bias and sensitivity errors have been determined, simply reading the gyro and deducing that a non-zero measurement corresponds to a rotation is not sufficient because the non-zero measurement may be due to the bias error. Similarly, due to bias and sensitivity errors, the accelerometer may read exactly 9.8 $m/s^2$ when the device is still and might also read 9.8 $m/s^2$ when the device is in motion. In contrast, the magnetometer will show changes in the magnetic field when there is a change in the orientation, which may provide a reliable indication of motion.

Furthermore, it is possible to produce mechanical motion that makes it look, based on measurements from these sensors, like the device is stationary. For example, this can be achieved by mechanically sliding the device at a constant velocity along a path without rotation. The constant velocity will cause the accelerometer to not change, and the lack of rotation will prevent the gyro or magnetometer from detecting any motion. In this case, because the gyro is not rotating, the bias can be determined. Other examples of mechanical motion where there is a constant but non-zero rotational velocity, any change in orientation will be detected in measurements from the accelerometer and/or magnetometer.

This framework suggests that to determine the degree of motion, the degree by which each available sensor is changing must be determined. To this end, and assuming no bias and sensitivity errors, the reliability of the sensors can be ranked as follows. The gyro is reliably determinative in that if the gyro rate is changing, then it can be conclusively determined that the device is in motion. The second most deterministic sensor is the magnetometer in that if the values it sees are changing, rotational motion is occurring or the device is moving near a dynamic magnetic field. The accelerometer is the least determinative because static accelerometer data could simply mean constant velocity, including angular velocity. However, changing accelerometer data is determinative of the fact that the device is in motion.

Embodiments of the disclosed technology can accurately determine low motion with varying degrees of accuracy when one or more of the sensors are available. In order of accuracy (from most accurate to least accurate), the following sets of sensors can be used to determine the degree of motion:

1. gyroscope, magnetometer, and accelerometer
2. gyroscope and magnetometer
3. gyroscope and accelerometer
4. gyroscope (alone)

Furthermore, any algorithm used to measure the degree of motion must account for measurement noise in each of the sensors. However, noise levels and noise floor data for a sensor are typically well documented in its data sheet, and can be accounted for in the algorithm.

An Example Algorithm for Determining the Degree of Motion

Figure 2:
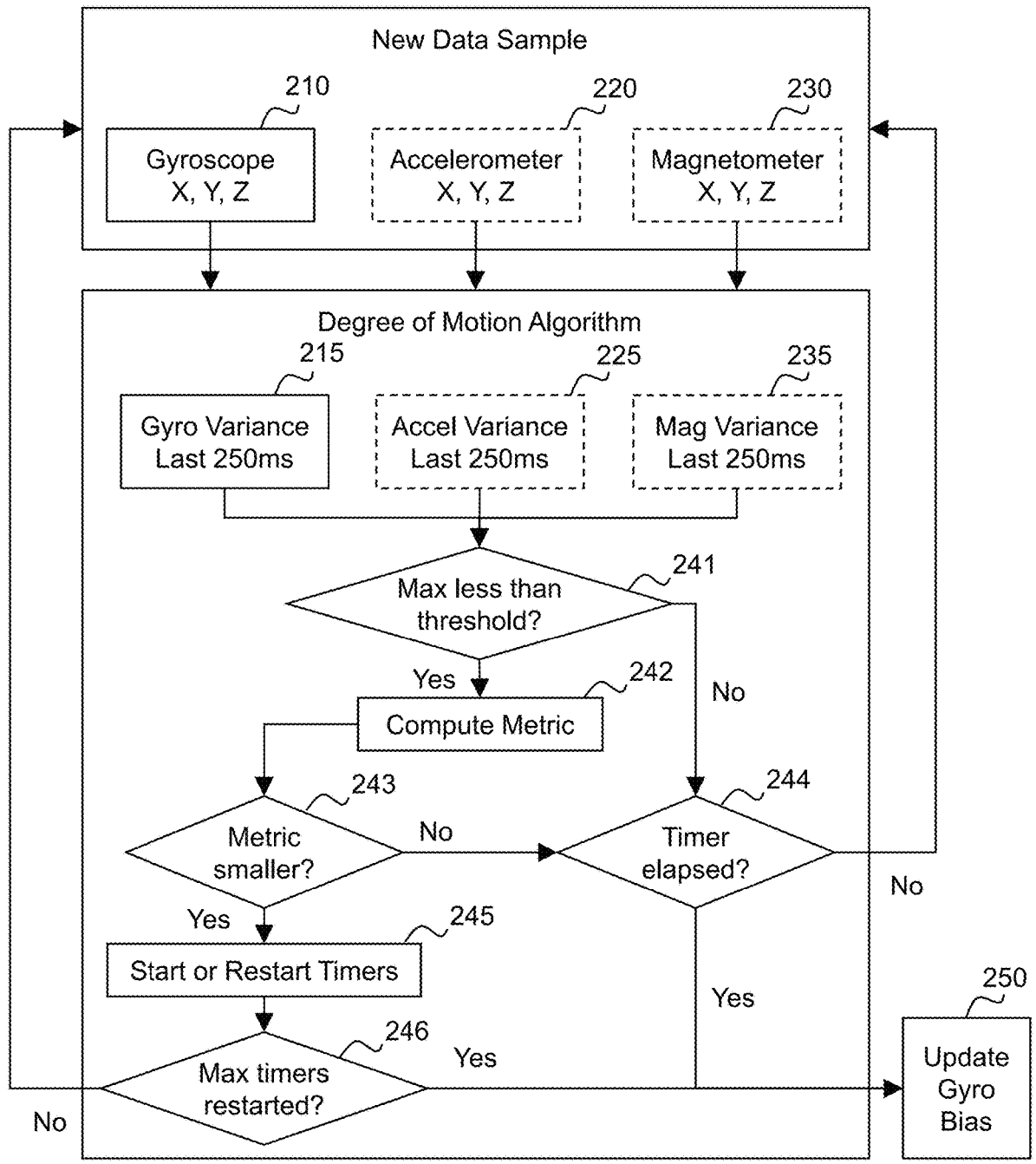
FIG. 2 illustrates an example block diagram for degree of motion estimation, and gyroscope bias updating, in the presence of motion.

FIG. 2 illustrates an example block diagram for a degree of motion estimation algorithm, and gyroscope bias updating, in the presence of motion. As shown therein, a new data sample comprising gyroscope measurements (210), and optionally, accelerometer measurements (220) or magnetometer measurements (230), are used in the degree of motion algorithm that calculates the biased sample variance of each motion sensor's axes (215, 225, 235). A degree of motion metric is calculated (242) and stored with the sensor readings. While the timer has not elapsed ("No" at 244), if a lower metric is found ("Yes" at 243), the previously stored metric and sensor readings are replaced with the new ones and the timer is restarted (245). Once the timer has elapsed ("Yes" at 244), the metric and stored readings are used to perform the bias update (250). In some embodiments, when the timer has been restarted numerous times, a bias update is performed at a predetermined time or predetermined duration after an event. This ensures that in the scenario where sporadic motion results in frequently updating the degree of motion metric (and subsequently, restarting the timer) without producing a bias update, the user experience is improved by necessarily generating a bias update.

Biased sample variance example. The biased sample variance of each axis of each available motion sensor is calculated after every new sample. The time period over which to calculate the variance is selected based on the application. In the example of a contact lens, this time period must be shorter than a saccade, or 250 ms. If the sensor were running at 100 Hz, then the variance would be calculated over 25 samples. In some embodiments, the biased sample variance is determined as:

$$S^2 = \frac{1}{n}\sum_{i=1}^{n}(x_i - \underline{x})^2.$$

Herein, n is the number of samples, $\underline{x}$ is the mean of the samples, and $x_i$, i=1, 2, . . . , n are the previous n samples, e.g., with n=25 for the contact lens example.

Figure 3:
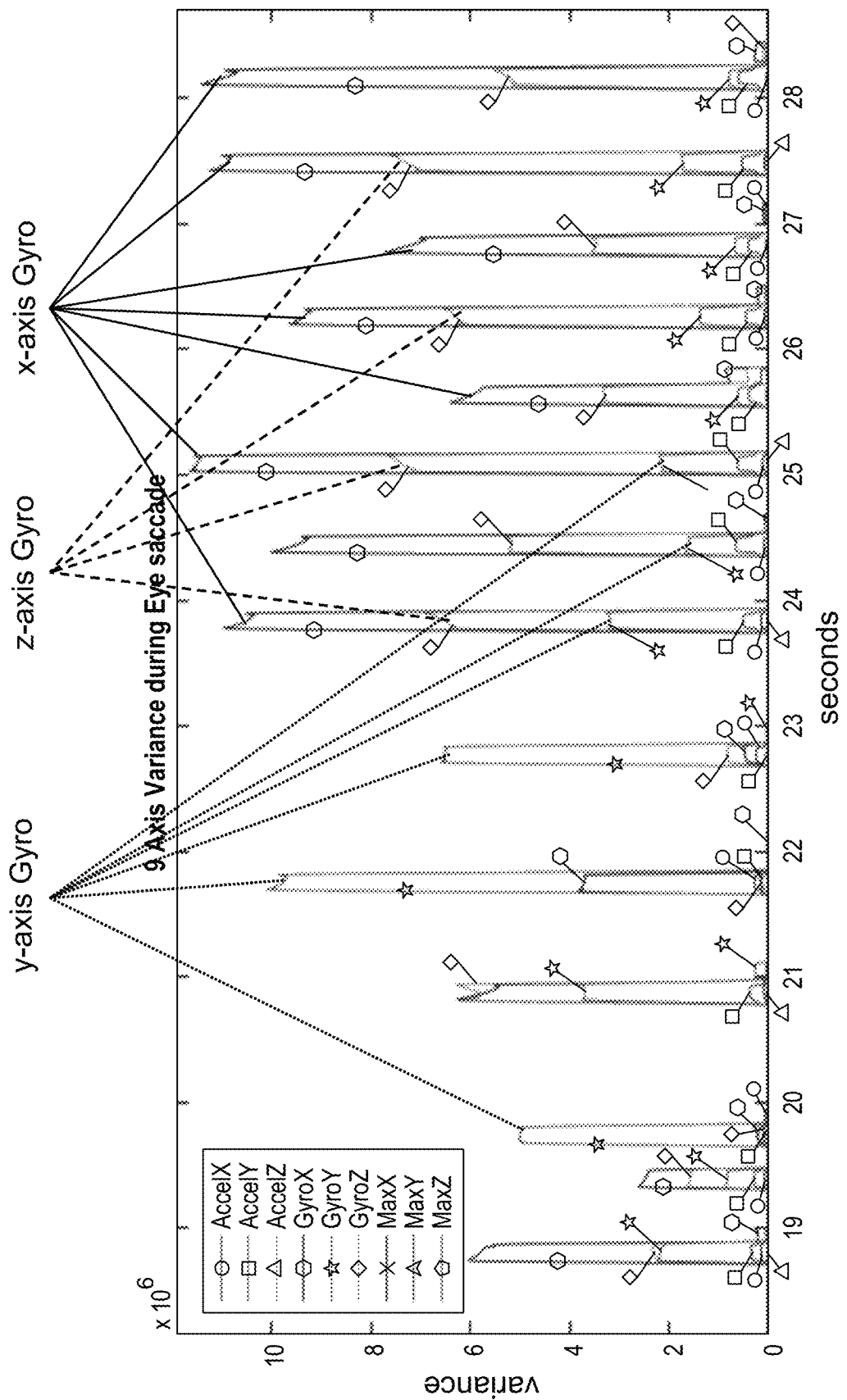
FIG. 3 illustrates an example of a large measured variance during eye saccades and a small measured variance in between eye saccades.
Figure 4:
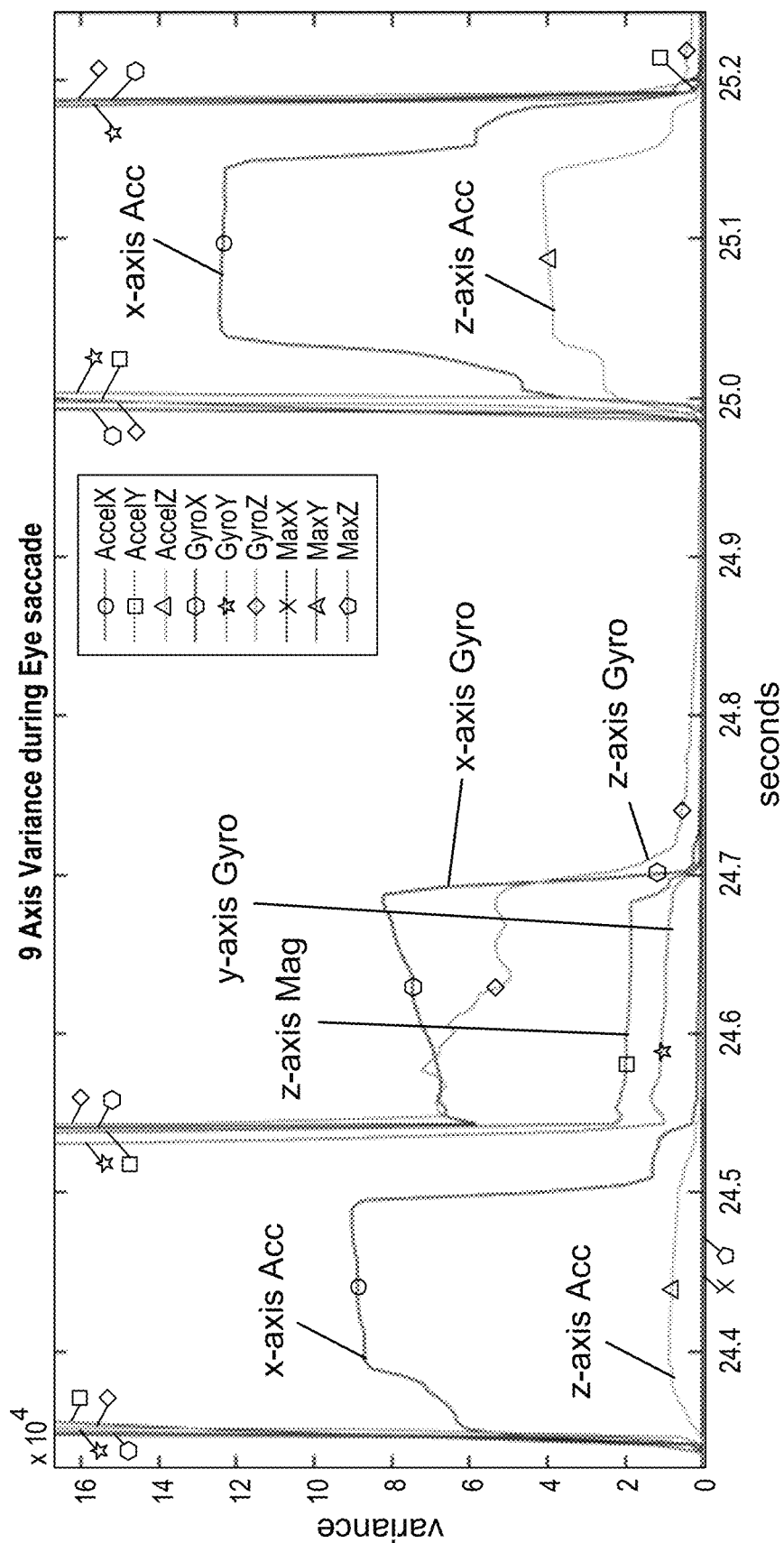
FIG. 4 illustrates another example of a large measured variance during eye saccades and a small measured variance in between eye saccades.

As shown in FIG. 2, the variance of each axis of each sensor is computed for each new data sample. This creates a sliding variance window, which when examined over short periods of time (e.g., in between saccades for the contact lens), yields a minimum value. FIGS. 3 and 4 illustrate examples of how the variance of at least one axis of one sensor is very large during motion, and very small between motion periods, e.g., periods of low motion.

Figure 5:
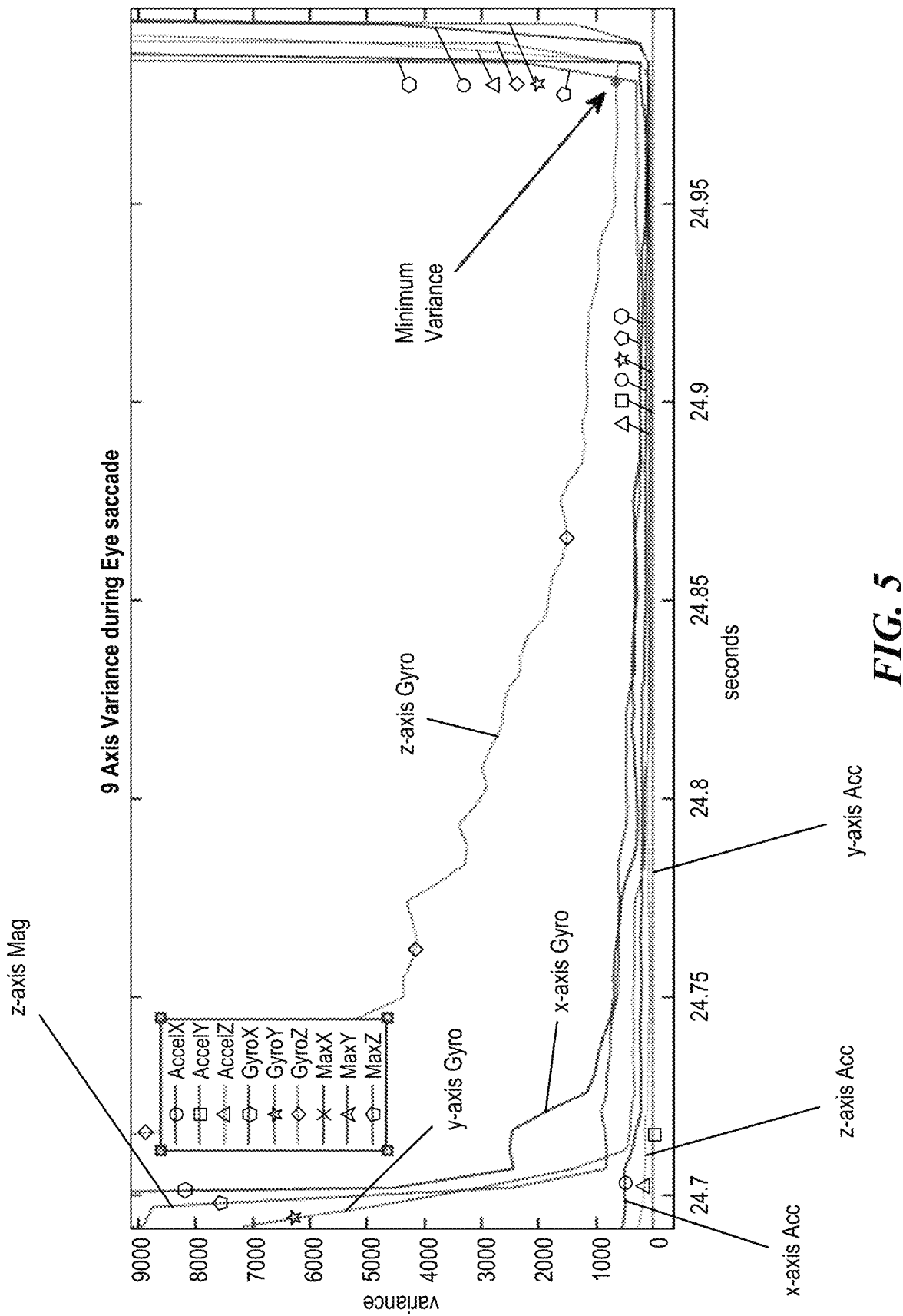
FIG. 5 illustrates an example of tracking the measured variance to find the sample-by-sample minimum measured variance for eye motion.

FIG. 5 shows an example of how the variance is tracked to find the sample-by-sample minimum, which for eye motion is usually (but not always) right before new motion.

Degree of motion metric example. The maximum variance of each available sensor's axis are scaled by the root-mean-square (RMS) noise of that sensor and then multiplied. If a sensor is not available, $S^2$ (the biased sample variance) and the RMS for that sensor are set to 1 so that it does not contribute to the metric. In an example, the degree of motion metric (m) is computed as:

$$m = \frac{S^2_{gyro}S^2_{accel}S^2_{mag}}{RMS^2_{gyro}RMS^2_{accel}RMS^2_{mag}}$$

In some embodiments, this metric is used to determine if the degree of motion is lower than a previously detected degree of motion.

Bias estimate update. Once the timer has elapsed, a new bias estimate is available. The algorithm keeps track of (i) a running bias estimate, which is updated based on the degree of motion metric detected before the timer has elapsed, and (ii) a convergence estimate. In some embodiments, these factors can be used to determine a weight that is applied to the old bias estimate. Once a weight (w) has been determined, it is applied as follows:

$$bias_{new}=(1-w)bias_{old}+w \cdot bias_{new}.$$

In an example, if the weight is 1, the old bias is completely replaced by the new bias, and the weight gets closer to zero as the algorithm gets closer to converging.

In some embodiments, the convergence metric is calculated based on the variance and size of the bias updates $bias_{new}$. If the updates have been consistent and small, the convergence is said to be high, and the convergence metric approaches 0. However, if the updates are larger, the convergence is said to be low, and the convergence metric approaches 1.

Figure 6:
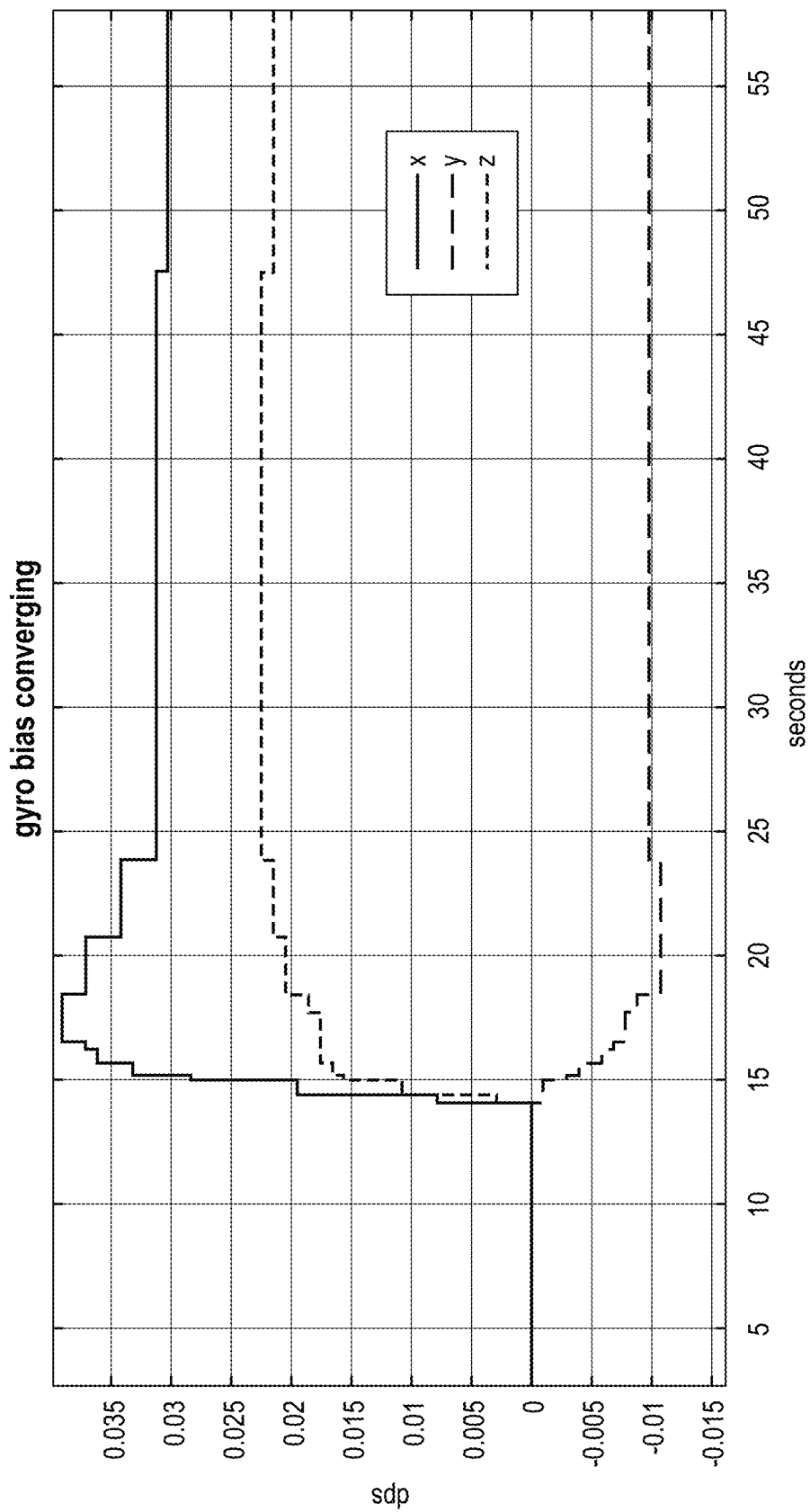
FIG. 6 illustrates an example plot of the gyroscope bias converging.

The weight is computed by multiplying the convergence metric by the degree of motion metric. As previously discussed, higher levels (or ranges) of motion have a lower degree of motion metric, whereas lower levels of motion will have a degree of motion metric approaching 1. This means that initially, the system will have no convergence, and the convergence metric will be close to 1, and the weight will be very close to the degree of motion metric. As the bias converges, the convergence metric will become smaller, requiring a higher degree of motion metric (i.e., less motion) to update the bias. An example of the gyro bias converging is illustrated in FIG. 6.

Over time, as the part ages, temperature changes, or additional stresses affect the bias, the convergence metric will grow as the bias changes. This advantageously enables the bias to be continually updated even if there has been no motion and perfect convergence.

Combining with no motion. In some embodiments, a device may be placed on a surface and experience no motion. In this case, several consecutive bias updates can be averaged to replace the current bias update.

Mitigation of mechanical motion or low-variance motion. Embodiments of disclosed technology are configured to determine the bias of a gyroscope in the presence of motion by being able to determine periods of time where there is low motion. However, in some scenarios, the motion of the device may be slow enough such that the variance over the short period of time, which is examined and processed, is low enough to trigger a bias update, allowing small rotational velocity to be considered bias.

In order to mitigate this issue, several sequential short periods of low variance are combined to create a long term variance metric. The magnetometer or accelerometer may not change very much over the short period (typically 250 ms) and be considered low motion, but will change significantly over several of these short periods (typically 8-16 periods for a total of 2-4 seconds). This allows for slow, low noise rotations to be correctly detected, and not used to trigger a bias update.

Example Applications for Gyro Bias Calibration in the Presence of Motion

Virtual reality goggles for head tracking: In an example application, implementations of the disclosed technology are used in virtual reality (VR) goggles (e.g., for head tracking or augmented reality (AR) applications) to advantageously enable the image seen by the user of the VR goggles to remain stable. VR goggles may be susceptible to path dependent rotations (e.g., rotations return to original location, but one or more gyro axes experience a non-zero net rotation) that may result in a different orientation than what was originally started with (if the gyro bias and/or sensitivity were not well calibrated).

It is typical for a user to place the virtual reality (VR) headset on their head, and hold any motion detecting devices in their hands before powering on the set. Thus, during the entire time that the headset is on, or devices held, there is human motion present. If the bias is not calibrated, the user will experience a constant rotation about an axis (and not always the Z-axis), disorienting the user and potentially causing nausea. One solution to this requires the user to take the device off and place the handheld devices on a surface for a short period of time at startup so that the device experiences no motion. Since the user will typically stand as still as they can while setting up the device, this provides a period of low motion that can be used to determine the gyro bias. There are other periods of low motion that can be opportunistically determined if the user is not still enough at the start of the VR experience.

Figure 7A:
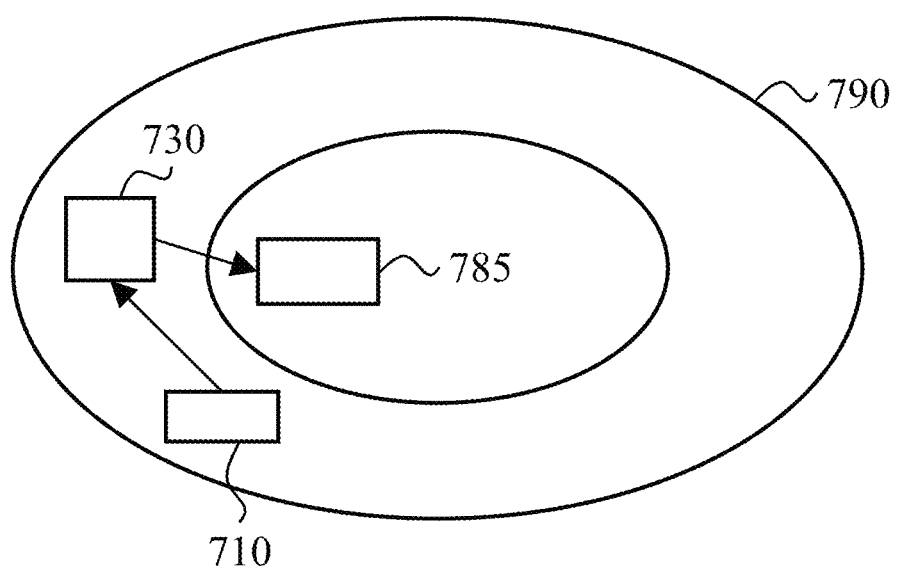
FIG. 7A illustrates an example schematic of a smart contact lens for eye tracking.
Figure 7B:
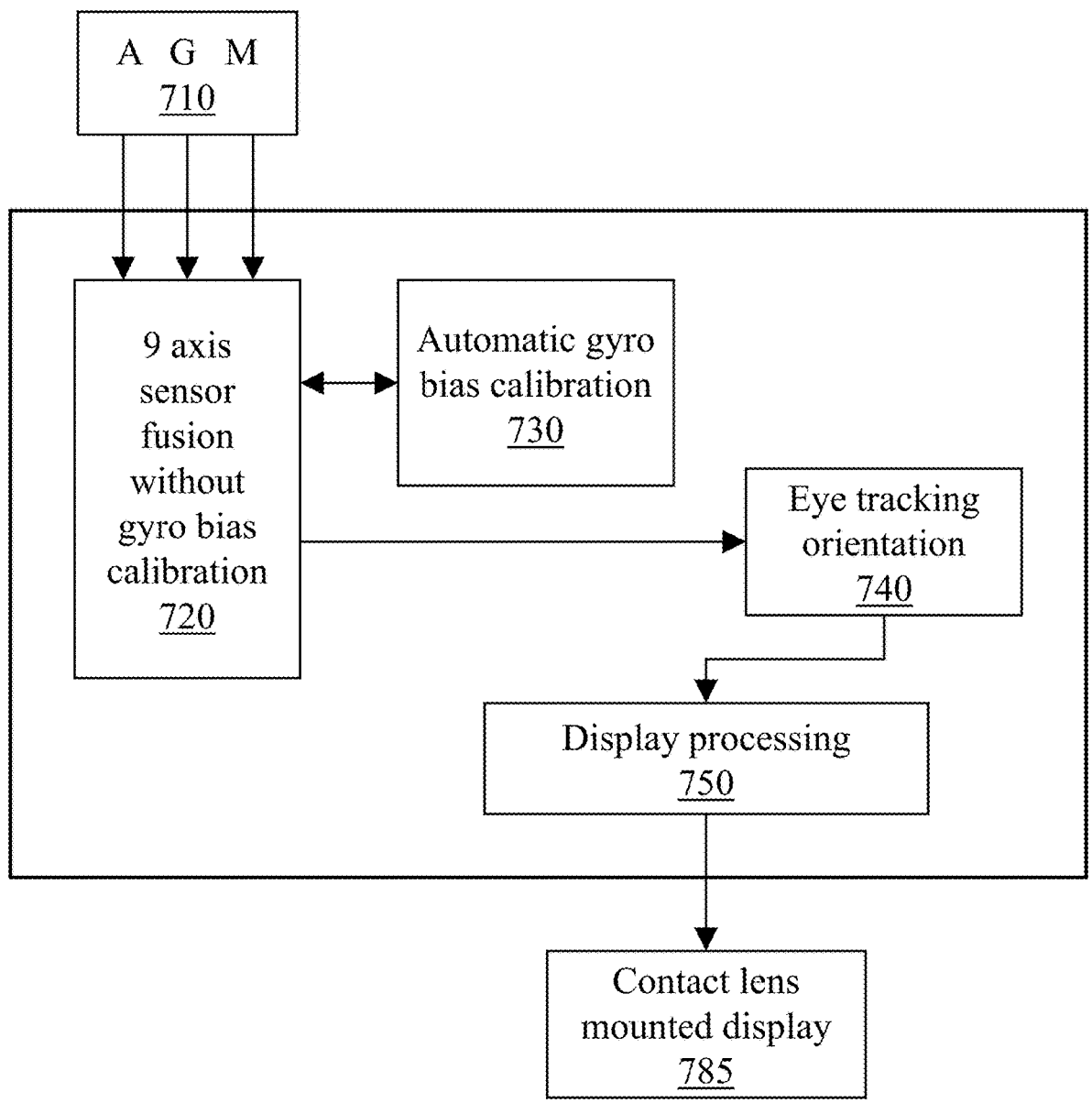
FIG. 7B illustrates an example block diagram of a smart contact lens for eye tracking.

Smart contact lenses for eye tracking: In an example application, implementations of the disclosed technology may be used in smart contact lenses for eye tracking. FIGS. 7A and 7B show simplified block diagrams of a smart contact lens framework that incorporates an automatic gyro bias calibration module that provides a better eye tracking experience for the user. As shown in FIG. 7A, the display 785 and associated sensor package 710 may be mounted on a contact lens 790 so that the display motion matches the motion of the eye. In the framework shown in FIG. 7B, the sensors 710 provide measurements to a 9-axis sensor fusion module 720 that operates without gyro bias calibration. The 9-axis sensor fusion module 720 exchanges measurements with an automatic gyro bias calibration unit 730, which computes the gyro bias using, in part, the degree of motion algorithm described above. The calibrated measurements are then transmitted to the eye tracking orientation module 740, which then updates the display processing unit 750. Finally, device can provide application data, based on calibrated measurements, to the contact lens mounted display 785.

Eye motion adds significant challenges as compared to head motion tracking since angular velocity and angular acceleration of the eye are both much higher than those experienced during head tracking. The eye regular makes rapid jumps (known as "saccades") with angular acceleration rates often exceeding 20,000 degrees/$sec^2$. During these jumps, eye tracking will rely almost entirely on the gyroscope outputs.

If there is a gyro bias, it may seem to the user that the world is spinning in addition to errors in the jump from each saccade. Even small bias errors could quickly accumulate to cause large errors in heading which would make a contact lens navigation application orient the user in the wrong direction. Larger errors could easily cause nausea. Either will cause a frustrating user experience in general. Being able to update the gyro bias estimate during these short periods of low motion solves this calibration issue and results in the room looking still when it is and maintaining a correct heading or orientation.

Baseball training: In an example application, implementations of the disclosed technology may be used to calculate baseball velocity. In order to accurately calculate baseball velocity at pitcher release, the observed acceleration vector must be integrated using the correct orientation. The required level of accuracy means the gyro bias must be calibrated.

Figure 8A:
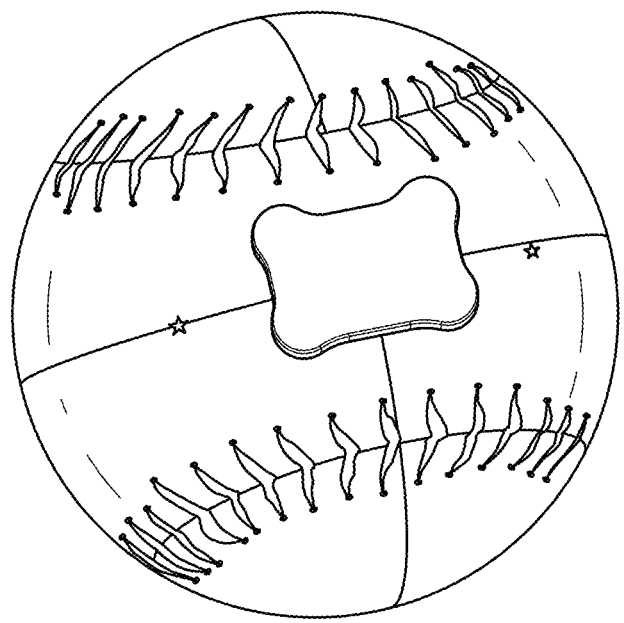
FIG. 8A illustrates a functioning prototype of a baseball trainer.
Figure 8B:
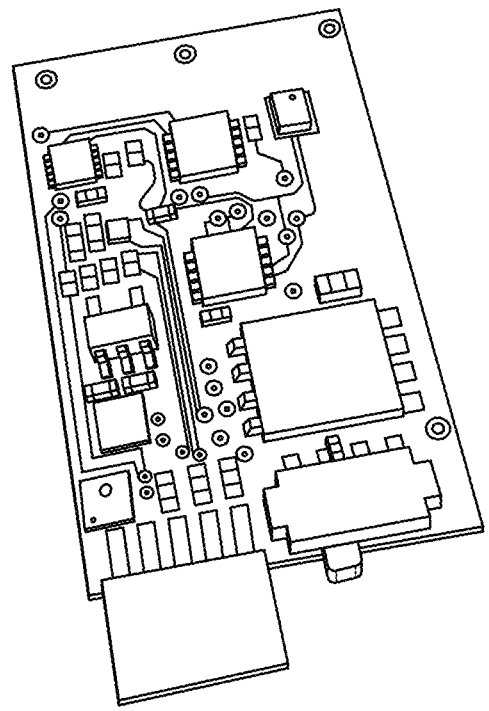
FIG. 8B illustrates a circuit board used in the prototype shown in FIG. 8A.
Figure 8C:
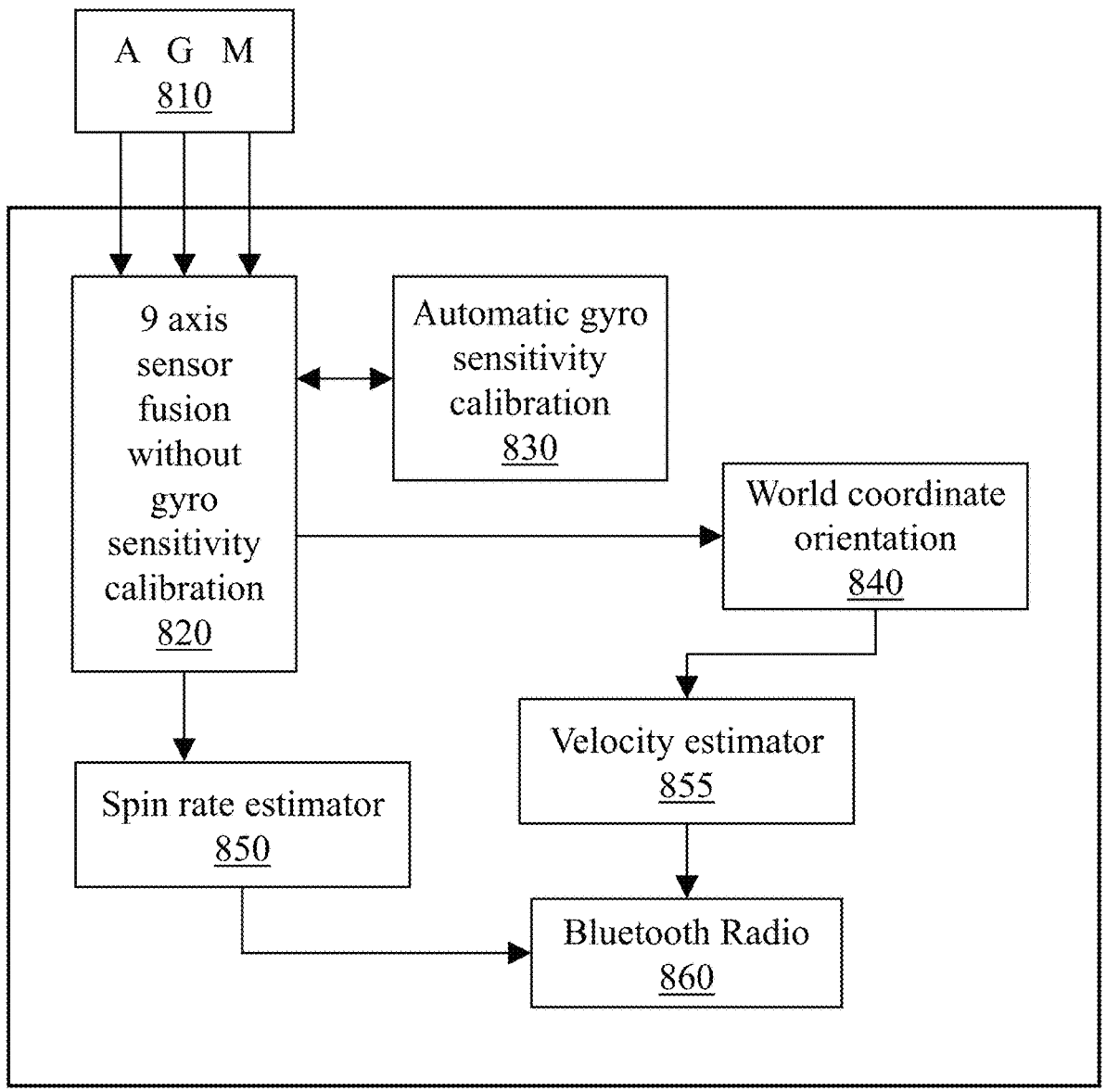
FIG. 8C illustrates an example block diagram of a baseball trainer.

FIGS. 8A and 8B example photos for a baseball trainer that include implementations of the disclosed technology. FIG. 8C shows a simplified block diagram for an example baseball trainer that include implementations of the disclosed technology, and which includes several components similar to those described in FIG. 7C that will not be separately described here.

As shown in FIG. 8C, the output processing is customized to this application, and includes a world coordinate orientation unit 840 receiving calibrated data from the 9-axis sensor fusion module 820, which also sends this calibrated data to a spin rate estimator 850. The world coordinate orientation unit 840 output is fed to a velocity estimator 855, and finally a Bluetooth radio 860 receives spin and velocity estimates and communicates it wirelessly.

In this application, the sensors experience considerable shock when the ball is caught, or otherwise hits a fixed object. Since MEMS rate gyroscopes can experience parameter changes as a result of shock, it is critical to perform automatic updates to both the bias and sensitivity. Otherwise, device velocity calculation accuracy will tend to worsen with use. In addition, asking the user to place the baseball on a still surface before each throw will lead to a poor user experience, and is also challenging considering the device is round. Being able to calibrate while in hand leads to a much improved user experience.

Indoor navigation: In an example application, implementations of the disclosed technology may be used to provide navigation in indoor environments that may have serious magnetic anomalies (e.g., hard and soft iron) that can cause systems to lose calibration or cause improper calibration, or at the very least render the magnetometer data unreliable for significant time. While the navigation device is rarely, if ever, placed on a stationary surface, it is usually constantly held or attached to a person. Auto calibration of gyro bias in the presence of motion will allow better heading accuracy during magnetic anomalies since the gyro and accelerometer can be relied upon to maintain correct heading.

Physical therapy and motion tracking garments: In some embodiments, a physical therapy device may be made with multiple sensor clusters that can be coupled to the body. The relative changes in rotation and/or translation between the sensor clusters may be measured as the user goes through either a sports exercise or physical therapy regimen using embodiments of the disclosed technology. For example, gyro bias calibration will be necessary for each sensor cluster in order to accurately measure relative rotation and prevent rotation during periods of low motion. Using the auto bias calibration implementations described herein, the expensive and time consuming step of factory gyro bias calibration can be avoided, and the devices do not need to be powered before placing on the patient. Also, the auto calibration will adapt for more accurate measurements as temperature, mechanical stress changes, and aging of the sensor effects change the optimal calibration values.

Example Methods and Implementations for the Disclosed Technology

Embodiments of the disclosed technology support inter alia the following technical solutions that solve the technical problem of calibrating a rate gyroscope in a device while the device is in motion.

In one example embodiment, a method for automatic calibration in a device in motion comprises receiving a plurality of measurements from a gyroscope while in motion. The method further includes generating an estimate of the variance of the gyroscope over a short period of time, generating an estimate of the degree of motion during the short period of time, generating an estimate of the bias of the gyroscope in the presence of motion, generating an estimate of the angular velocity of the device, and generating an orientation estimate based on the sum of the angular velocity.

In one example embodiment, the method further includes receiving the plurality of measurements from a magnetometer. The method also includes generating an estimate of the variance of the magnetometer during the same short period of time that the device is in motion as the gyroscope, generating an estimate of the degree of motion of the magnetometer. Then, the method includes combining the degree of motion estimate of the gyroscope with the degree of motion estimate of the magnetometer to generate a combined degree of motion estimate, and using the degree of motion estimate to update the estimate of the bias of the gyroscope.

In one example embodiment, the other sensor is an accelerometer in motion

In one example embodiment, both a magnetometer and an accelerometer are used.

In one example embodiment, any number of gyroscopes, accelerometers, and magnetometers may be included in the device.

In one example embodiment, the method further includes generating a long term degree of motion estimate by combining several short term degree of motion estimates, and then updating the bias estimate dependent on the long term degree of motion estimate.

In one example embodiment, the device comprises a pair of virtual-reality (VR) goggles wherein the device constantly experiences motion from its user, and the method also includes computing the degree of motion and updating the gyro bias according to the degree of motion metric to reduce or eliminate erroneous rotation, providing for an improved user experience.

In one example embodiment, the device comprises a contact lens or lenses, wherein the lens or lenses constantly experience motion from its user, and the method further includes computing the degree of motion and updating the gyro bias according to the degree of motion metric to reduce or eliminate erroneous rotation, providing for an improved user experience.

In one example embodiment, the method includes both a virtual-reality (VR) system and contact lens or lenses wherein all devices constantly experience motion from its user. In this embodiment, the method also includes computing the degree of motion and updating the gyro bias according to the degree of motion metric to reduce or eliminate erroneous rotation, providing for an improved user experience.

In one example embodiment, the device is operated for indoor navigation.

In one example embodiment, an apparatus for automatic calibration in a device, that experiences continuous motion, comprises a processor and memory including instructions stored thereupon. The instructions upon execution by the processor cause the processor to receive a first plurality of measurements from a gyroscope. The instructions upon execution by the processor also cause the processor to generate an estimate of the variance of the gyroscope over a short period of time, generate an estimate of the degree of motion during the short period of time, generate an estimate of the bias of the gyroscope in the presence of motion, calibrate the gyroscope based on the estimate of the bias, generate an estimate of the angular velocity of the device, and generate an orientation estimate based on the sum of the angular velocity.

In one example embodiment, the instructions upon execution by the processor cause the processor to receive a plurality of measurements from a magnetometer experiencing the same motion as the gyroscope.

In one example embodiment, the instructions upon execution by the processor cause the processor to receive a plurality of measurements from an accelerometer experiencing the same motion as the gyroscope.

In one example embodiment, the instructions upon execution by the processor cause the processor to receive a plurality of measurements from any number of gyroscopes, accelerometers, and/or magnetometers experiencing the same motion as the gyroscope.

In one example embodiment, the instructions upon execution by the processor cause the processor to generate a long term degree of motion estimate by combining several short term degree of motion estimates, and update the bias estimate dependent on the long term degree of motion estimate.

In one example embodiment, the device is embedded in a baseball, a softball, a football, or another sports device.

In one example embodiment, the device is embedded in something a user wears, such as a glove, a shoe, a helmet, a vest, or a physical therapy harness.

In one example embodiment, a method for automatic gyroscope bias calibration in a device while the device is in motion is described. The method includes receiving, while the device is in motion, a plurality of measurements from one or more sensors in the device, wherein the one or more sensors comprise a gyroscope. The plurality of measurements is acquired over a time period. The method also includes identifying one or more time segments, within the time period, having a low motion activity of the device by comparing a computed value associated with a motion of the device to a predetermined threshold. The method further includes determining, based on one or more measurements acquired over the one or more time segments, a degree of motion metric for at least one of the one or more sensors, and determining, based on the degree of motion metric for the at least one of one or more sensors, an estimate of a bias of the gyroscope.

In one example embodiment, a device comprising one or more sensors that include a gyroscope is described. The device includes a processor coupled to the one or more sensors, and a memory including instructions stored thereupon. The instructions upon execution by the processor cause the processor to receive, while the device is in motion, a plurality of measurements from one or more sensors in the device, wherein the plurality of measurements is acquired over a time period. The instructions upon execution by the processor also cause the processor to identify one or more time segments, within the time period, having a low motion activity of the device by comparing a computed value associated with a motion of the device to a predetermined threshold. The instructions upon execution by the processor further cause the processor to determine, based on one or more measurements acquired over the one or more time segments, a degree of motion metric for at least one of the one or more sensors, and determine, based on the degree of motion metric for the at least one of the one or more sensors, an estimate of a bias of the gyroscope.

In one example embodiment, a method and/or system is configured to receive a plurality of measurements from one or more sensor clusters comprising a gyroscope and any number of accelerometers and or magnetometers that experience the same motion as the gyroscope, while the device is worn and in motion.

Figure 9:
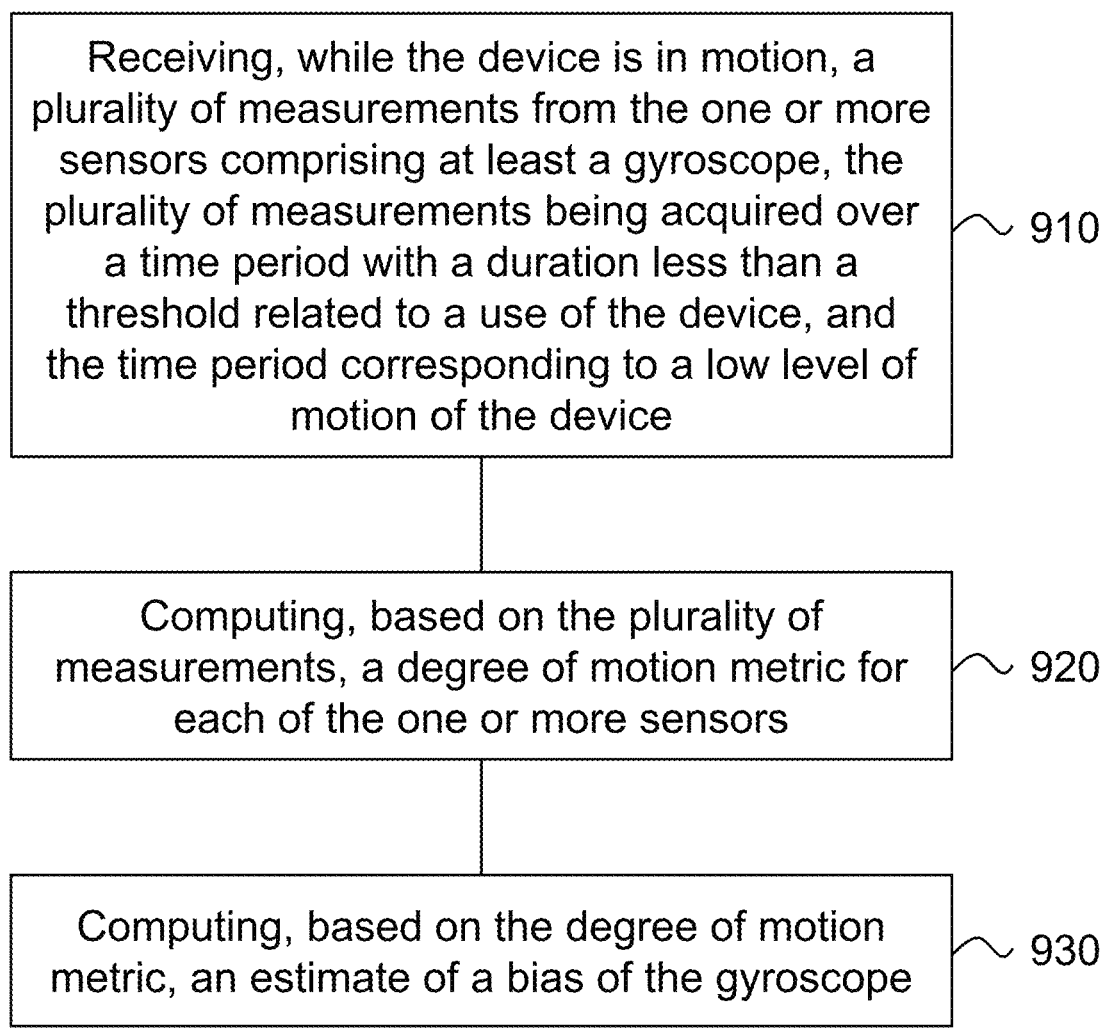
FIG. 9 shows a flowchart of an example method for automatic calibration of rate gyroscope bias without a truth reference and in the presence of motion.

FIG. 9 shows a flowchart of an example method 900 for automatic calibration of rate gyroscope bias in the presence of motion. The method 900 includes, at operation 910, receiving, while the device is in motion, a plurality of measurements from the one or more sensors comprising at least a gyroscope, the plurality of measurements being acquired over a time period with a duration less than a threshold related to a use of the device, and the time period corresponding to a low level of motion of the device.

The method 900 includes, at operation 920, computing, based on the plurality of measurements, a degree of motion metric for each of the one or more sensors.

The method 900 includes, at operation 930, computing, based on the degree of motion metric, an estimate of a bias of the gyroscope.

Figure 10:
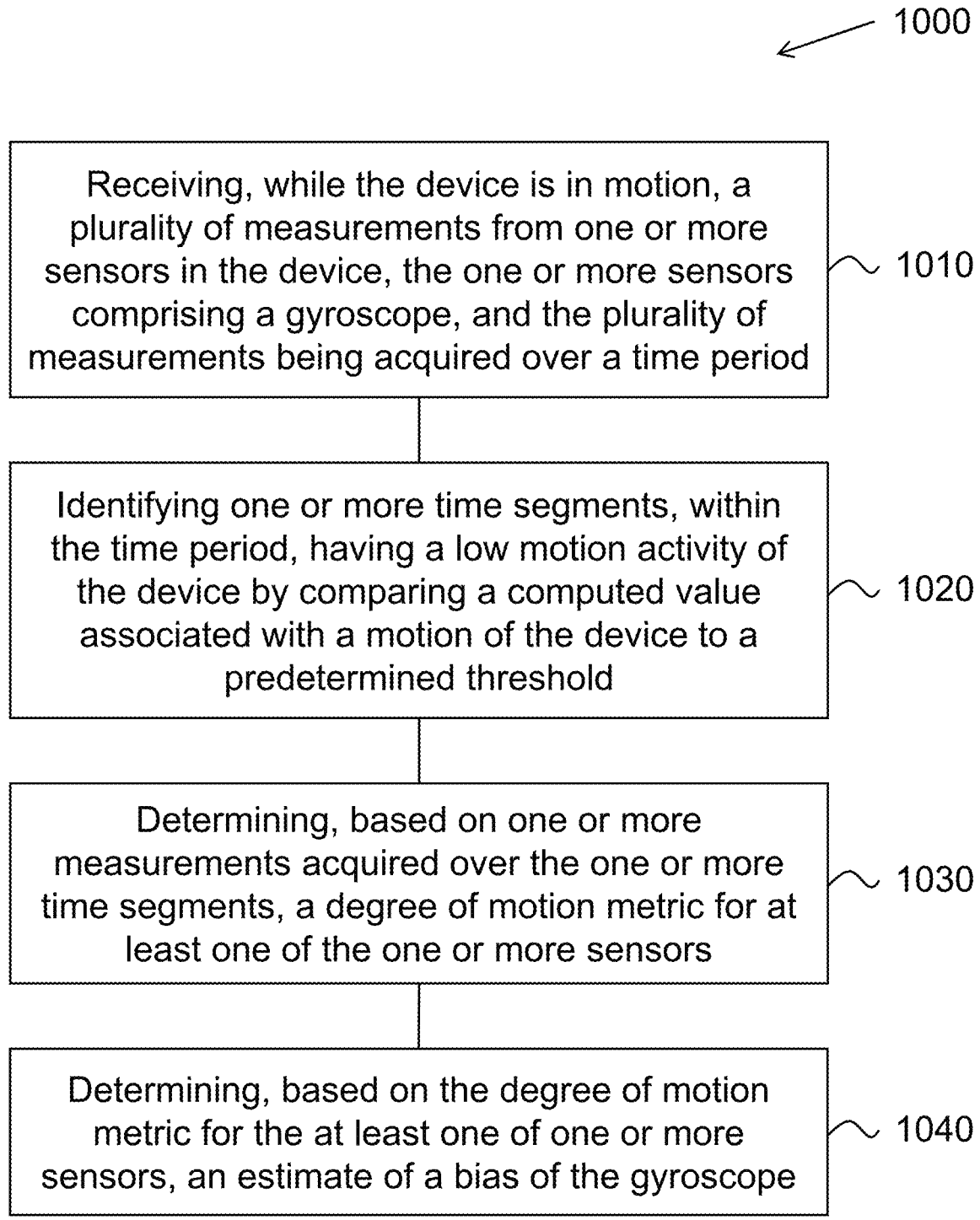
FIG. 10 shows a flowchart of another example method for automatic calibration of rate gyroscope bias without a truth reference and in the presence of motion.

FIG. 10 shows a flowchart of another example method 1000 for automatic calibration of rate gyroscope bias in the presence of motion. The method 1000 includes, at operation 1010, receiving, while the device is in motion, a plurality of measurements from one or more sensors in the device. In this embodiment, the one or more sensors comprise a gyroscope, and the plurality of measurements is acquired over a time period.

The method 1000 includes, at operation 1020, identifying one or more time segments, within the time period, having a low motion activity of the device by comparing a computed value associated with a motion of the device to a predetermined threshold.

The method 1000 includes, at operation 1030, determining, based on one or more measurements acquired over the one or more time segments, a degree of motion metric for at least one of the one or more sensors.

The method 1000 includes, at operation 1040, determining, based on the degree of motion metric for the at least one of one or more sensors, an estimate of a bias of the gyroscope.

In some embodiments, the computed value is based on a biased sample variance of the one or more measurements of a corresponding sensor of the one or more sensors.

In some embodiments, the one or more sensors comprises a magnetometer.

In some embodiments, the method 1000 further includes the operation of generating a combined degree of motion metric by combining the degree of motion metric of the gyroscope and the degree of motion of the magnetometer, wherein the estimate of the bias of the gyroscope is based on the combined degree of motion metric.

In some embodiments, the one or more sensors comprises an accelerometer.

In some embodiments, the combined degree of motion metric is generated by combining the degree of motion metric of the accelerometer.

In some embodiments, a value of the predetermined threshold is selected based on a type of the device. In some examples, the device may be a smart contact lens, whereas in another example, the device may be virtual reality (VR) goggles. When the device is a smart contact lens, the value of the predetermined threshold is selected to be substantially smaller than the value of the predetermined threshold when the device is the VR goggles. This is motivated by the fact that a low motion scenario for the VR goggles may correspond to a large amount of motion for the smart contact lens. Thus, the predetermined threshold is selected based on the type of the device.

In some embodiments, at least two of the time segments are non-contiguous.

In some embodiments, at least two of the time segments are contiguous.

In some embodiments, the degree of motion metric is determined based on a biased sample variance of the one or more measurements and a root mean square (RMS) noise of a corresponding sensor of the one or more sensors.

In some embodiments, determining the estimate of the bias includes determining the estimate of the bias based on a convergence metric that corresponds to a frequency of bias updates for the device.

In some embodiments, the method 1000 further includes the operation of receiving, while the device is not in motion, additional measurements from the at least one of the one or more sensors, wherein the determining the estimate of the bias of the gyroscope includes determining the bias of the gyroscope based on the additional measurements.

In some embodiments, the device is a virtual reality system or a contact lens. In other embodiments, the device is embedded in an article of clothing or a sporting good.

Embodiments of the disclosed technology include a device comprising one or more sensors that include a gyroscope is described. The device includes a processor coupled to the one or more sensors, and a memory including instructions stored thereupon. The instructions upon execution by the processor cause the processor to receive, while the device is in motion, a plurality of measurements from one or more sensors in the device, wherein the plurality of measurements is acquired over a time period. The instructions upon execution by the processor also cause the processor to identify one or more time segments, within the time period, having a low motion activity of the device by comparing a computed value associated with a motion of the device to a predetermined threshold. The instructions upon execution by the processor further cause the processor to determine, based on one or more measurements acquired over the one or more time segments, a degree of motion metric for at least one of the one or more sensors, and determine, based on the degree of motion metric for the at least one of the one or more sensors, an estimate of a bias of the gyroscope.

In some embodiments, the one or more sensors comprises at least an accelerometer and/or a magnetometer.

In some embodiments, the device is a virtual reality system or a contact lens. In other embodiments, the device is embedded in an article of clothing or a sporting good.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document. In this document, the word exemplary is used to convey an example.

What is claimed is:

1. A method for improving bias calibration in a device, comprising:
    receiving, while the device is in motion, a plurality of measurements from one or more sensors in the device, wherein the one or more sensors comprise a gyroscope, and wherein the plurality of measurements is acquired over a time period;
    identifying one or more time segments, within the time period, having a low motion activity of the device by comparing a computed value associated with a motion of the device to a predetermined threshold;
    determining, based on one or more measurements acquired over the one or more time segments, a degree of motion metric for at least one of the one or more sensors; and
    determining, based on the degree of motion metric for the at least one of the one or more sensors, an estimate of a bias of the gyroscope.

2. The method of claim 1, wherein the computed value is based on a biased sample variance of the one or more measurements of a corresponding sensor of the one or more sensors.

3. The method of claim 1, wherein the one or more sensors comprises a magnetometer.

4. The method of claim 3, comprising:
    generating a combined degree of motion metric by combining the degree of motion metric of the gyroscope and the degree of motion of the magnetometer, wherein the estimate of the bias of the gyroscope is based on the combined degree of motion metric.

5. The method of claim 4, wherein the one or more sensors comprises an accelerometer.

6. The method of claim 5, wherein the combined degree of motion metric is generated by combining the degree of motion metric of the accelerometer.

7. The method of claim 1, wherein a value of the predetermined threshold is selected based on a type of the device.

8. The method of claim 1, wherein at least two of the one or more time segments are non-contiguous.

9. The method of claim 1, wherein at least two of the one or more time segments are contiguous.

10. The method of claim 1, wherein the degree of motion metric is determined based on a biased sample variance of the one or more measurements and a root mean square (RMS) noise of a corresponding sensor of the one or more sensors.

11. The method of claim 10, wherein determining the estimate of the bias includes determining the estimate of the bias based on a convergence metric that corresponds to a frequency of bias updates for the device.

12. The method of claim 1, comprising:
receiving, while the device is not in motion, additional measurements from the at least one of the one or more sensors, wherein the determining the estimate of the bias of the gyroscope includes determining the bias of the gyroscope based on the additional measurements.

13. A device with improved bias calibration, comprising:
one or more sensors comprising a gyroscope;
a processor coupled to the one or more sensors; and
a memory including instructions stored thereupon, wherein the instructions upon execution by the processor cause the processor to:
receive, while the device is in motion, a plurality of measurements from one or more sensors in the device, wherein the plurality of measurements is acquired over a time period;
identify one or more time segments, within the time period, having a low motion activity of the device by comparing a computed value associated with a motion of the device to a predetermined threshold;
determine, based on one or more measurements acquired over the one or more time segments, a degree of motion metric for at least one of the one or more sensors; and
determine, based on the degree of motion metric for the at least one of the one or more sensors, an estimate of a bias of the gyroscope.

14. The device of claim 13, wherein the one or more sensors comprise a magnetometer or an accelerometer, and wherein the instructions upon execution by the processor cause the processor to:
generate a combined degree of motion metric by combining (a) the degree of motion metric of the gyroscope and (b) the degree of motion of the magnetometer or the degree of motion of the accelerometer, wherein the estimate of the bias of the gyroscope is based on the combined degree of motion metric.

15. The device of claim 13, wherein a value of the predetermined threshold is selected based on a type of the device.

16. The device of claim 13, wherein the computed value is based on a biased sample variance of the one or more measurements of a corresponding sensor of the one or more sensors, and wherein the degree of motion metric is determined based on the biased sample variance and a root mean square (RMS) noise of the corresponding sensor.

17. The device of claim 13, wherein the device is a virtual reality system or a contact lens.

18. The device of claim 13, wherein the device is embedded in an article of clothing or a sporting good.

19. A non-transitory computer-readable storage medium having instructions stored thereupon for improving bias calibration in a device, comprising:
instructions for receiving, while the device is in motion, a plurality of measurements from one or more sensors in the device, wherein the one or more sensors comprise a gyroscope, and wherein the plurality of measurements is acquired over a time period;
instructions for identifying one or more time segments, within the time period, having a low motion activity of the device by comparing a computed value associated with a motion of the device to a predetermined threshold;
instructions for determining, based on one or more measurements acquired over the one or more time segments, a degree of motion metric for at least one of the one or more sensors; and
instructions for determining, based on the degree of motion metric for the at least one of the one or more sensors, an estimate of a bias of the gyroscope.

20. The non-transitory computer-readable storage medium of claim 19, wherein the one or more sensors comprise a magnetometer or an accelerometer, and wherein the non-transitory computer-readable storage medium comprises:
instructions for generating a combined degree of motion metric by combining (a) the degree of motion metric of the gyroscope and (b) the degree of motion of the magnetometer or the degree of motion of the accelerometer, wherein the estimate of the bias of the gyroscope is based on the combined degree of motion metric.

* * * * *

UNITED STATES PATENT AND TRADEMARK OFFICE
CERTIFICATE OF CORRECTION

PATENT NO. : 12,196,575 B2  
APPLICATION NO. : 17/649346  
DATED : January 14, 2025  
INVENTOR(S) : Nathan Charles Royer et al.

Page 1 of 1

It is certified that error appears in the above-identified patent and that said Letters Patent is hereby corrected as shown below:

In the Specification

In Column 7, Line 62, delete "degrees/sec$^1$." and insert -- degrees/sec$^2$. --.

Signed and Sealed this  
First Day of July, 2025

Coke Morgan Stewart  
*Acting Director of the United States Patent and Trademark Office*